United States Patent
Gramlich et al.

(10) Patent No.: US 11,495,363 B2
(45) Date of Patent: Nov. 8, 2022

(54) SMALL MODULAR MOBILE FISSION REACTOR

(71) Applicant: BWXT Advanced Technologies LLC, Lynchburg, VA (US)

(72) Inventors: Craig D. Gramlich, Forest, VA (US); William E. Russell, II, Lynchburg, VA (US)

(73) Assignee: BWXT Advanced Technologies LLC, Lynchburg, VA (US)

( * ) Notice: Subject to any disclaimer, the term of this patent is extended or adjusted under 35 U.S.C. 154(b) by 0 days.

(21) Appl. No.: 16/864,178

(22) Filed: May 1, 2020

(65) Prior Publication Data

US 2020/0373027 A1    Nov. 26, 2020

Related U.S. Application Data

(60) Provisional application No. 62/841,930, filed on May 2, 2019.

(51) Int. Cl.
*G21C 3/38* (2006.01)
*G21C 7/12* (2006.01)
(Continued)

(52) U.S. Cl.
CPC ............... *G21C 7/12* (2013.01); *G21C 3/322* (2013.01); *G21C 3/38* (2013.01); *G21C 5/06* (2013.01);
(Continued)

(58) Field of Classification Search
CPC ...... G21C 1/12; G21C 1/32–328; G21C 3/18; G21C 5/126; G21C 15/06; G21C 3/38; G21C 5/06; G21D 5/02
(Continued)

(56) References Cited

U.S. PATENT DOCUMENTS 2,936,277 A * 5/1960 MacNeill ................. G21C 7/08
376/227
3,069,341 A * 12/1962 Farrington ............... G21D 5/08
376/391
(Continued)

FOREIGN PATENT DOCUMENTS

| GB | 924748 A | 5/1963 |
| GB | 963565 A | 7/1964 |
| GB | 1243374 A | 8/1971 |

OTHER PUBLICATIONS

Jensen and Nonbol, "Description of the Magnox Type of Gas Cooled Reactor (Magnox)", Nov. 1998, 83 pgs., retrieved from the internet <https://inis.iaea.org/collection/NCLCollectionStore/_Public/30/052/30052480.pdf>.

(Continued)

*Primary Examiner* — Jack W Keith
*Assistant Examiner* — Jinney Kil
(74) *Attorney, Agent, or Firm* — Morgan, Lewis & Bockius LLP

(57) ABSTRACT

A mobile modular reactor, in particular, a graphite-moderated fission reactor, has an active core region and at least a portion of control region(s) that are located within an interior volume of a pressure vessel. Flow annulus features located in the flow annulus between an outer surface of the control rod/fuel rod and an inner surface of the cladding of the channel in which the rod is located stabilizes the flow annulus and maintains a reliable concentricity between the inner and outer claddings that envelope the flow annulus. Flow annulus features are equally circumferentially spaced at longitudinally separated locations and the flow annulus features at successive, longitudinally separated locations are rotationally offset relative to each other. For purposes of transportability, the pressure vessel is sized for mobile (Continued)

transport using a ship, train or truck, for example, by fitting within a shipping container.

18 Claims, 12 Drawing Sheets

(51) Int. Cl.
    *G21F 5/06*     (2006.01)
    *G21C 3/322*     (2006.01)
    *G21C 5/06*     (2006.01)
    *G21C 13/02*     (2006.01)
    *G21C 7/117*     (2006.01)

(52) U.S. Cl.
    CPC ............... *G21C 13/02* (2013.01); *G21F 5/06* (2013.01); *G21C 7/117* (2013.01)

(58) Field of Classification Search
    USPC .................. 376/243, 427, 909, 235, 453–454
    See application file for complete search history.

(56) References Cited

U.S. PATENT DOCUMENTS

| | | | | |
|---|---|---|---|---|
| 3,075,910 A * | 1/1963 | Taylor | .................... | G21C 15/04 376/364 |
| 3,105,805 A * | 10/1963 | Rodwell | ................ | G21C 1/326 376/304 |
| 3,111,475 A | 11/1963 | Davidson | | |
| 3,212,987 A * | 10/1965 | Avrel | .................... | G21C 15/02 376/352 |
| 3,257,288 A * | 6/1966 | Boudouresques | ..... | G21C 15/04 376/454 |
| 3,352,757 A * | 11/1967 | Dee et al. | ................ | G21C 3/04 376/423 |
| 3,720,580 A * | 3/1973 | Schabert | .................. | G21C 7/12 376/223 |
| 3,738,912 A | 6/1973 | Rachor et al. | | |
| 3,773,617 A * | 11/1973 | Marmonier | ............ | G21C 7/103 376/327 |
| 3,794,560 A * | 2/1974 | Rohr | ........................ | G21C 3/04 376/411 |
| 3,926,720 A | 12/1975 | Hosegood | | |
| 3,930,941 A * | 1/1976 | Meerwald | ................ | G21C 3/08 976/DIG. 45 |
| 4,300,630 A * | 11/1981 | Trojani | .................. | B23K 9/203 165/181 |
| 2008/0152069 A1 | 6/2008 | Aktas et al. | | |
| 2016/0049210 A1 * | 2/2016 | Filippone | ................ | G21C 1/32 376/220 |
| 2017/0263345 A1 | 9/2017 | Venneri et al. | | |

OTHER PUBLICATIONS

E. Nonbol, "Description of the Advanced Gas Cooled Type of Reactor (AGR)", Nov. 1996, 88 pgs., retrieved from the internet <https://inis.iaea.org/collection/NCLCollectionStore/_Public/28/028/28028509.pdf>.

J.A. Vitali et al., "Mobile Nuclear Power Plants for Ground Operations", Oct. 26, 2018, 148 pgs., retrieved from the internet <https://apps.dtic.mil/dtic/tr/fulltext/u2/1064604.pdf>.

J. Buongiorno, "PWR Description", MIT OpenCourseWare, 22.06 Engineering of Nuclear Systems, Fall 2010, 33 pgs., retrieved from the internet <https://ocw.mit.edu/courses/nuclear-engineering/22-06-engineering-of-nuclear-systems-fall-2010/lectures-and-readings/MIT22_06F10_Iec06a.pdf>.

CANDU 6 Technical Summary, May 2005, 63 pgs., retrieved from the internet <https://canteach.candu.org/Content%20Library/CANDU6_TechnicalSummary-s.pdf>.

Sealand, "Dry Cargo", 11 pgs., retrieved from the internet <https://www.sealandmaersk.com/en/our-solutions/dry-cargo>.

International Search Report and Written Opinion dated Oct. 1, 2020 issued in PCT/US20/30962.

\* cited by examiner

SMALL MODULAR MOBILE FISSION REACTOR

RELATED APPLICATION DATA

This application is based on and claims priority under 35 U.S.C. § 119 to U.S. Provisional Application No. 62/841,930, filed May 2, 2019, the entire contents of which are incorporated herein by reference.

TECHNICAL FIELD AND INDUSTRIAL APPLICABILITY

The disclosure relates generally to a modular mobile reactor, which can be embodied in a fission reactor and, in some embodiments, as a graphite-moderated fission reactor. In particular, the disclosure relates to a mobile, modular reactor in which an active core region and at least a portion of the at least one control region is located within an interior volume of a pressure vessel. Flow annulus features located in the flow annulus between an outer surface of the control rod/fuel rod and an inner surface of the cladding of the channel in which the rod is located stabilizes the flow annulus and maintains a reliable concentricity between the inner and outer claddings that envelope the flow annulus. Sections of the reactor can be pre-assembled as modular sections and later assembled into the reactor. For purposes of transportability, the pressure vessel is sized for mobile transport using a ship, train or truck, for example, by fitting within a standard 40 ft. shipping container.

Although this disclosure references and provides examples using a graphite-moderated, thermal fission reactor, the principles, compositions, structures, features, arrangements and processes described herein can apply to and be embodied in reactors using other moderators (such as water and light-elements) and other coolants (such as water, liquid metal, molten salts, and gas).

BACKGROUND

In the discussion that follows, reference is made to certain structures and/or methods. However, the following references should not be construed as an admission that these structures and/or methods constitute prior art. Applicant expressly reserves the right to demonstrate that such structures and/or methods do not qualify as prior art against the present invention.

As an example, a graphite-moderated reactor is a nuclear reactor that uses carbon as a neutron moderator, which allows low-enriched uranium to be used as nuclear fuel. Several types of graphite-moderated nuclear reactors have been used in commercial electricity generation, including gas-cooled reactors, water-cooled reactors, and high-temperature gas-cooled reactors.

FIG. 1 is a schematic, cross-sectional view of a conventional gas-cooled graphite reactor 10 and an associated heat exchanger 20. The gas-cooled graphite reactor 10 includes clad fuel 12 surrounded by graphite 14, which functions as the moderator for the nuclear fission reaction that occurs in the clad fuel 12. The clad fuel 12 and graphite 14 are housed in a pressure vessel 30, with suitable penetrations 60 for support features, such as for control rods 16, instrumentation (not shown). A coolant inlet line 40 and coolant outlet line 42 provide a coolant path between the heat exchanger 20 and the gas-cooled graphite reactor 10. Radiation shielding 50 encloses the reactor 10, although certain penetrations 60 may be present, such as for control rod equipment and charging tubes. Coolant circulates (with the assistance of gas circulator 70) within the coolant path, whereby cool gas coolant supplied to the graphite reactor 10 via coolant inlet line 40 is heated by the reactor 10 as the gas traverses the reactor and then exits the gas-cooled graphite reactor 10 via coolant outlet line 42. The hot gas coolant exiting the gas-cooled graphite reactor 10 is supplied to the heat exchanger 20, which transfers the energy from the heated coolant gas to a secondary coolant, such as water, as in the water/steam heat exchanger shown in FIG. 1.

The conventional graphite-moderated nuclear reactors are plant size reactors, with large containment buildings and acreage footprints. Examples of graphite reactors include the Magnox reactor in the UK, a 835 MWt, carbon dioxide cooled reactor using magnesium-aluminum alloy clad natural uranium fuel; the UNGG reactor in France, a 540 MWe, carbon dioxide cooled reactor using magnesium-zirconium alloy clad natural uranium fuel, and the advanced gas-cooled reactor (AGR) in the UK, a 1200 MWe, carbon dioxide cooled reactor using stainless steel clad uranium dioxide fuel.

In recent years, there has been increasing interest in small, mobile reactors, especially in the arena of emergency response and military forward-base plant power. However, to date it has been difficult to address and balance competing characteristics for a mobile nuclear power plant (MNPP), including reduced (comparatively) manufacturing costs, transportability, safety, simple installation, and sufficient power generation capacity (e.g., 1-10 MWt).

SUMMARY

In general, the disclosure relates to a modular mobile reactor, which in some embodiments is a graphite-moderated fission reactor, that is transportable and on a mobile platform for as-needed relocation to provide a mobile power source for short-term and long-term purposes, including emergency response purposes. These characteristics are met by a combination of features including, for example, use of tristructural-isotropic (TRISO) fuel and negative thermal reactivity feedback (due to graphite thermal properties) to provide innate reactor safety; leveraging proven TRISO designs, cladding manufacturing, reactivity control rod drive mechanisms, and pressure vessel design to yield an economic design; locating the entire reactor and heat rejection system on a mobile-based platform, such as "sea lands" or shipping containers for ease of use and installation; and basic and simple geometry design of the reactor core for stable reactor neutronics and simplified reactor analytics.

Embodiments of a mobile, graphite-moderated fission reactor include a pressure vessel defining an interior volume, an active core region located within the interior volume of the pressure vessel, the active core region including fuel assemblies and a reflector, and at least a portion of the at least one control system is located in a control region within the interior volume of the pressure vessel. The fuel assembly includes a plurality of fuel unit cells and a plurality of control unit cells, each unit cell including a longitudinally extending graphite body with a longitudinally extending channel with a cladding. For the fuel unit cells, a fuel rod is positioned in the channel of each of the plurality of fuel unit cells and forms a flow annulus between an outer surface of the fuel rod and an inner surface of the cladding of the channel of the fuel unit cell; for the control unit cells, a control rod is positioned in the channel of each of the plurality of control unit cells and forms a flow annulus between an outer surface of the control rod and an inner surface of the cladding of the channel of the control unit cell. In some embodiments, a plurality of flow annulus features can be attached to at least one of the outer surface of the fuel rod and the inner surface of the cladding of the channel of the fuel unit cell. In other embodiments, a plurality of flow annulus features can be attached to at least one of the outer surface of the control rod and the inner surface of the cladding of the channel of the control unit cell. For purposes of transportability, the pressure vessel is sized for mobile transport using a ship, train or truck. In a particular embodiment, the mobile, graphite-moderated fission reactor includes a shipping container, wherein the pressure vessel is contained within the shipping container.

In one particular embodiment, the plurality of flow annulus features are located at equidistant, longitudinally separated locations, and, at each longitudinally separated location, there are at least three, circumferentially distributed, flow annulus features. Additionally, the plurality of flow annulus features are circumferentially distributed by equal spacing and are rotated half the radial spacing between adjacent longitudinal locations. These flow annulus features can be utilized in any of the applicable reactor types that may be designed as a modular mobile reactor.

BRIEF DESCRIPTION OF THE DRAWINGS

The foregoing summary, as well as the following detailed description of the embodiments, can be better understood when read in conjunction with the appended drawings. It should be understood that the embodiments depicted are not limited to the precise arrangements and instrumentalities shown.

Figure 1:
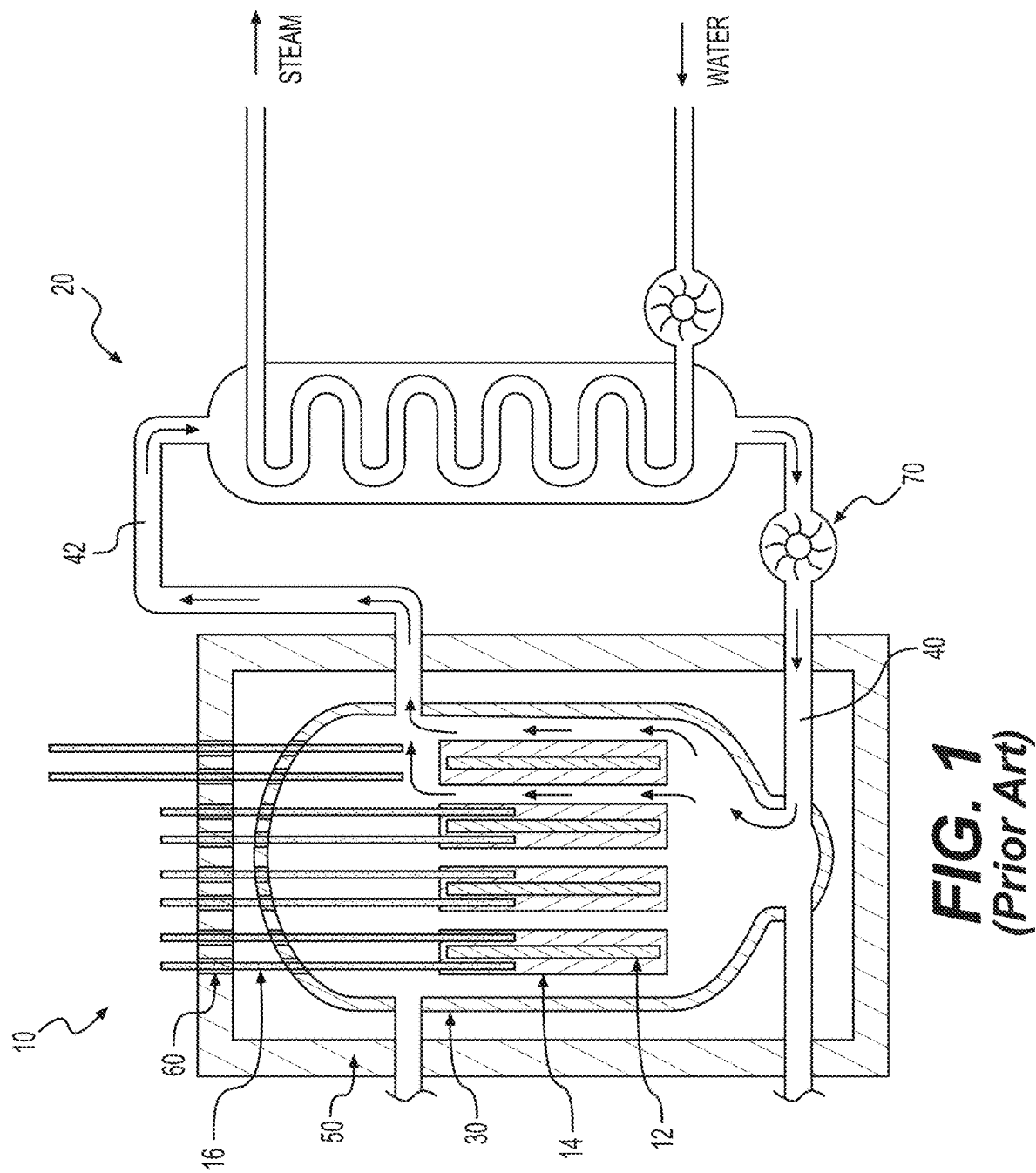
FIG. 1 is a schematic, cross-sectional view of a conventional gas-cooled graphite reactor and an associated heat exchanger.

Note, for ease of viewing, not all instances of the features shown in the figures are labeled with reference numerals.

DETAILED DESCRIPTION

Figure 2:
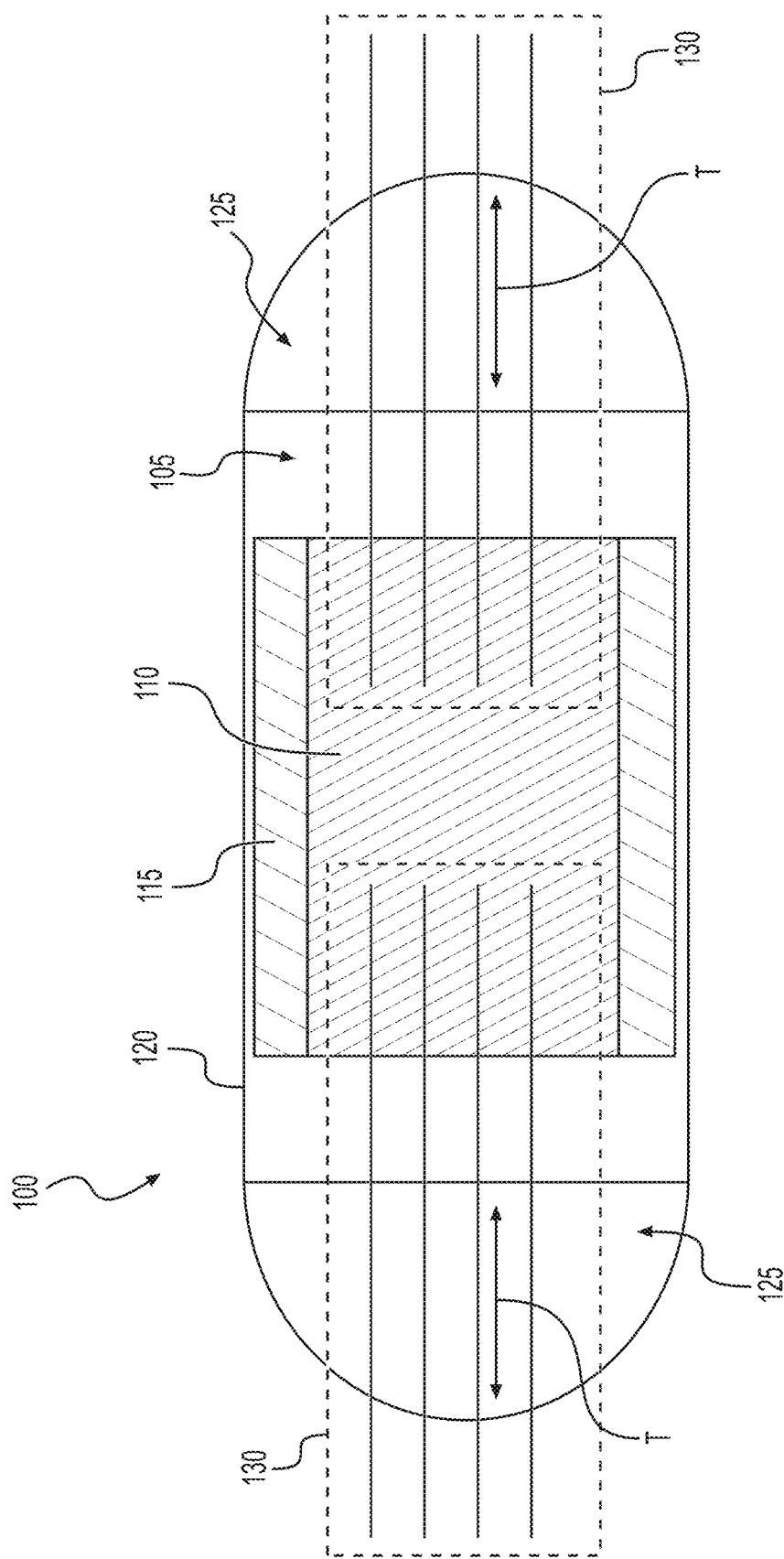
FIG. 2 is a schematic, longitudinal cross section illustrating the general arrangement of major components of an exemplary mobile graphite reactor.

FIG. 2 is a schematic, longitudinal cross section illustrating the general arrangement of major components of an exemplary mobile graphite reactor 100. The mobile graphite reactor 100 includes an active core region 105, which includes a fuel assembly region 110 within a reflector region 115, typically a reflector annulus. A core former adapts the outer peripheral geometry of the fuel assembly region 110 to the inner diameter geometry of the reflector region 115. The reflector region 115 mates geometrically and structurally with a pressure vessel 120, which encases at least the active core region 105. This mating accommodates thermal growth of the structures due to thermal expansion that occurs at operating temperatures.

The mobile graphite reactor 100 also includes at least one control region 125 that includes a control system (the control system including, for example, control rod drive mechanisms (CRDM) 130 and other necessary ancillary equipment). The exemplary embodiment in FIG. 2 includes two control regions 125, but more than one control region 125 is optional. The typically domed pressure vessel 120 sections corresponding to the control region(s) 125 mate to the cylindrically shaped pressure vessel 120 section associated with the active core region 105 with, for example, bolted flanges. The control region 125 can accommodate operation of the control rods drive mechanism 130 of the control system as they are moved (T) into and out of the active core region 105 to control reactivity during operation. The control rods drive mechanism(s) 130 can be located within the pressure vessel 120 or can protrude from the pressure vessel 120 in a location corresponding to the control region 125. If control rod drive mechanisms 130 are located in both control regions 125, the orientation of the control rods in each region are not co-axial or are otherwise offset to prevent interference when inserted into the fuel assembly region 110.

The active core 110 and reflector 115 diametric dimensions can be suitably sized for mobile transport and the desired output power level. For example, in one embodiment, the diameter of the pressure vessel containing the active core and reflector can be 197.5 cm, which would fit in a 40 foot shipping container and which can then be accommodated on a ship, train or truck. Such a sized reactor with TRISO fuel can be designed to produce 1-10 MWe with exit temperatures ranging from 800K-1100K, using a helium coolant configuration.

It will be appreciated that the power, dimensions, weight and other parameters discussed herein are examples and, more specifically, are examples based on TRISO fuel. Depending on fuel, moderator, and cladding materials, different temperature limits and different energy production ranges may be realized. Further, different TRISO fuel compositions as well as other, non-TRISO fuels are contemplated, such as compositions including UCO TRISO, UO2 TRISO, U-metal, UO2, UN, and other nuclear fuel (hafnium, thorium, plutonium, etc.).

Figure 3:
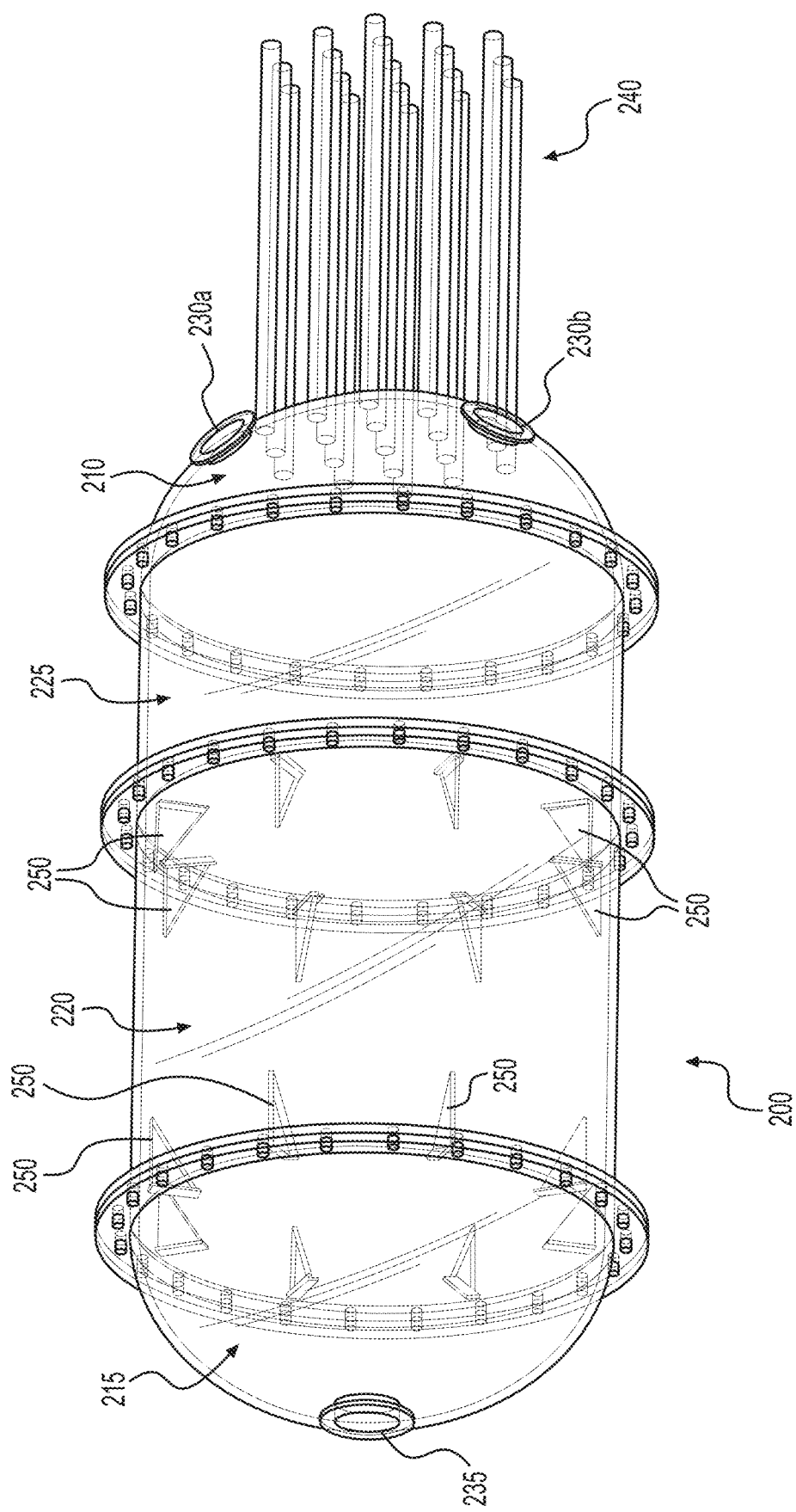
FIG. 3 illustrates a perspective view of an exemplary mobile graphite reactor showing a pressure vessel configured for one-sided, control rod insertion for reactivity control.

FIG. 3 illustrates a perspective view of an exemplary pressure vessel 200 for a mobile graphite reactor configured for one-sided, control rod insertion for reactivity control. The pressure vessel 200 surrounds and restrains the active core and control rod drive mechanisms and is comprised of an upper dome section 210 and lower dome section 215 and a main section 220 located corresponding to the active core region 105. An extension section 225 provides a stand-off distance between the active core region 105 and control region 125 to allow for the CRDM 130 stroke length. Each of these sections is bolted to the other via mating hole patterns, the number and location of which are as prescribed by the ASME Pressure Vessel Code.

The pressure vessel 200 has two cold leg ports 230a, 230b that are in fluid connection with a heat exchanger (not shown) and a hot leg port 235 in fluid connection with the heat exchanger (not shown). More or less hot and cold leg parts may be used per design constraints. In the embodiment shown in FIG. 3, the control rods drive mechanism(s) extend past the envelope of the upper dome section 210 and are contained within control rod drive shaft retention tubes 240. Alternatively, the control rod drive shaft retention tubes 240 could be housed within the pressure vessel 200 if the control rod motors meet the necessary design conditions. Each of the hot leg port flange, cold leg port flange, and control rod drive shaft retention tubes are welded to the appropriate section of the pressure vessel 200.

The pressure vessel 200 in FIG. 3 is shown in partial see-through view, which allows for observation of triangular struts 250 welded to the main section 220. These triangular struts 250 have bolt holes to affix upper and lower core plates that retain the fuel assemblies (discussed further below).

Figure 4:
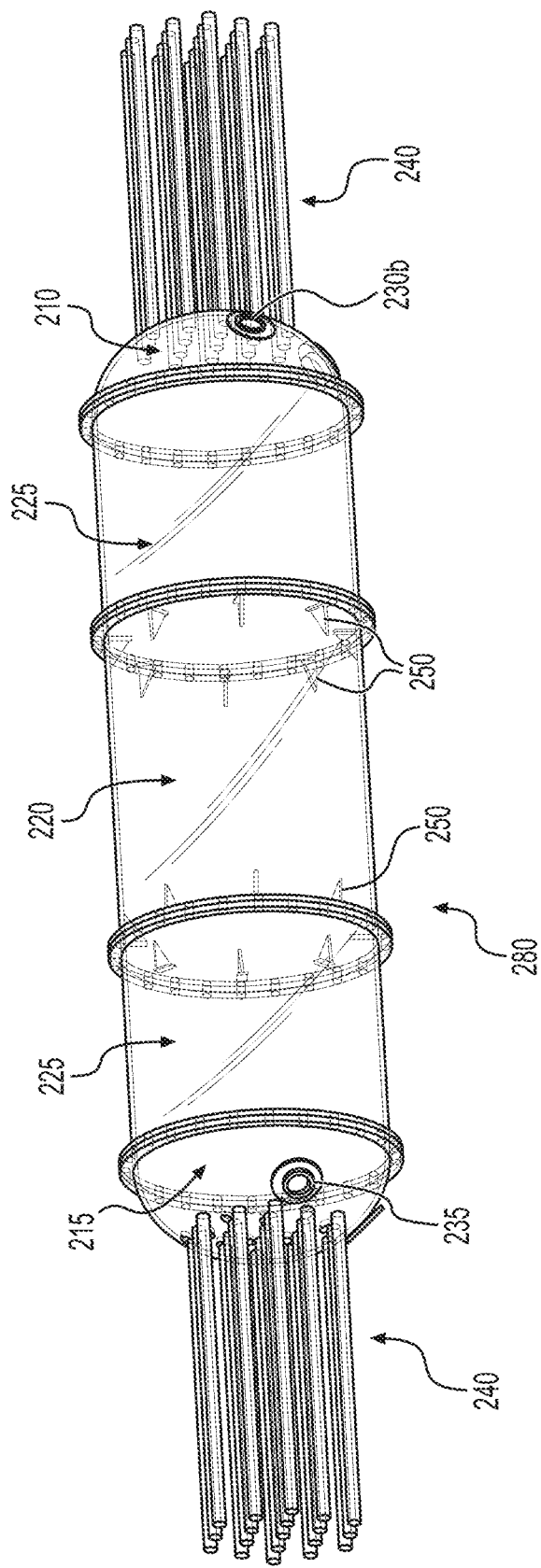
FIG. 4 illustrates a perspective view of an alternative exemplary mobile graphite reactor showing a pressure vessel configured for two-sided, control rod insertion for reactivity control.

In embodiments in which control rods are inserted from both ends, the lower dome section 215 shown in FIG. 3 can be removed and substituted by an extension section and dome section similar to extension section 225 and upper dome section 210, in which case the final pressure vessel appearance would be substantially symmetrical. FIG. 4 schematically illustrates such a symmetrical pressure vessel 280.

Figure 5:
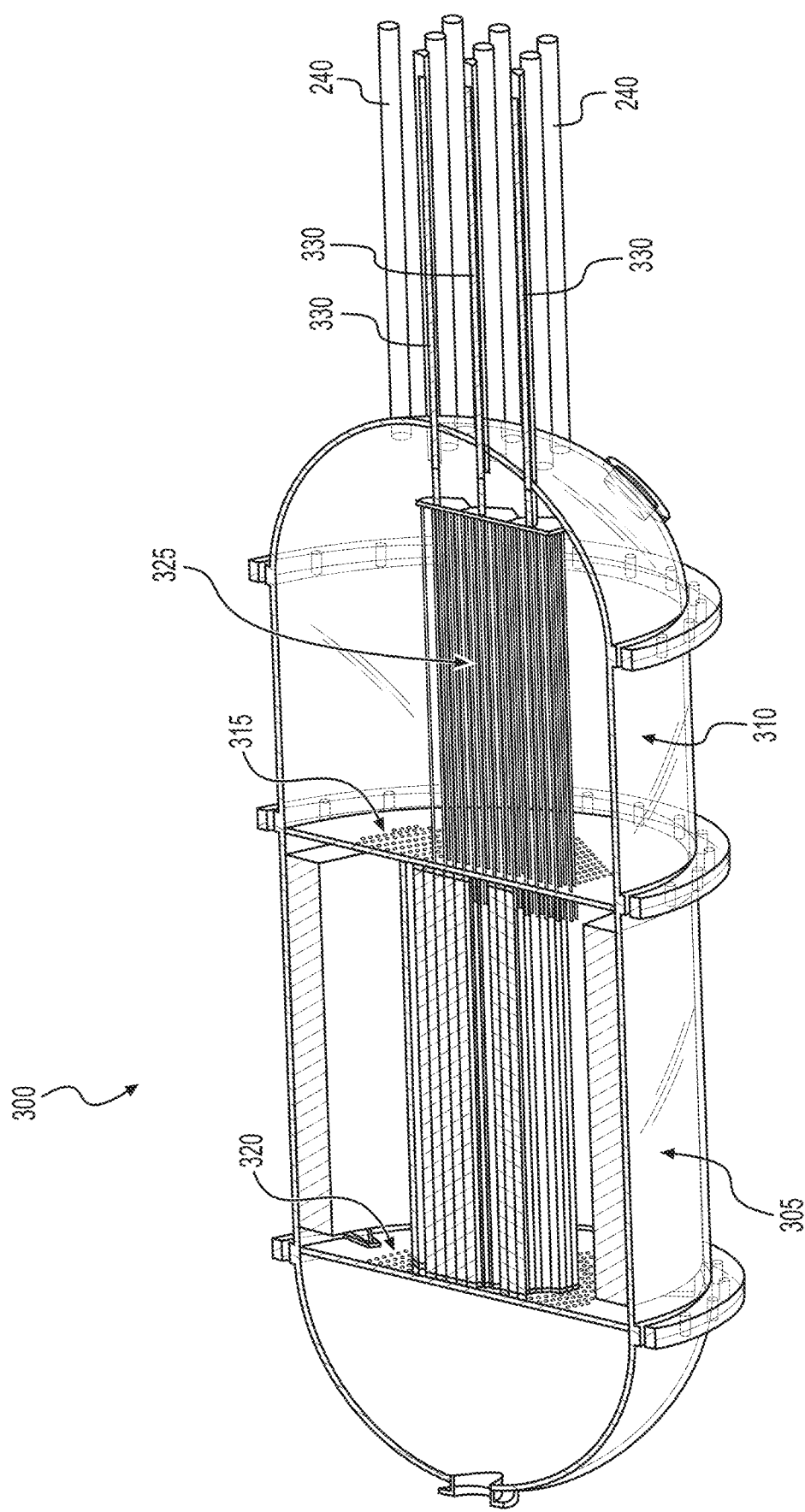
FIG. 5 is a schematic, longitudinal cross section illustrating the internal arrangement of major components in an exemplary mobile graphite reactor.

FIG. 5 is a schematic, longitudinal cross section illustrating the internal arrangement of major components in an exemplary mobile graphite reactor, such as that shown in FIG. 3. For assembly and safety, various sections and components are preassembled into subassembly units, each of which is subcritical, per neutron fission production. For example, the active core section 305 and control rod drive mechanism sections 310 (including control rods 325 and threaded shaft 330) of the mobile graphite reactor 300 can be assembled separately (with their respective pressure vessel section) and then brought together by joining the main section with the extension section. The overall reactor assembly is designed to confine the fuel assemblies and control rod drives within the pressure vessel, with the fuel assemblies transported separately and installed via pin locators in upper and lower core plates 315, 320. Alternatively, the assembled core can be transported with hard stops placed on the control rods to prevent core insertion. The CRDM equipment is shown outside the active core with the threaded shaft 330 of each CRDM 130 enveloped by control rod drive shaft retention tubes 240.

Figure 6A:
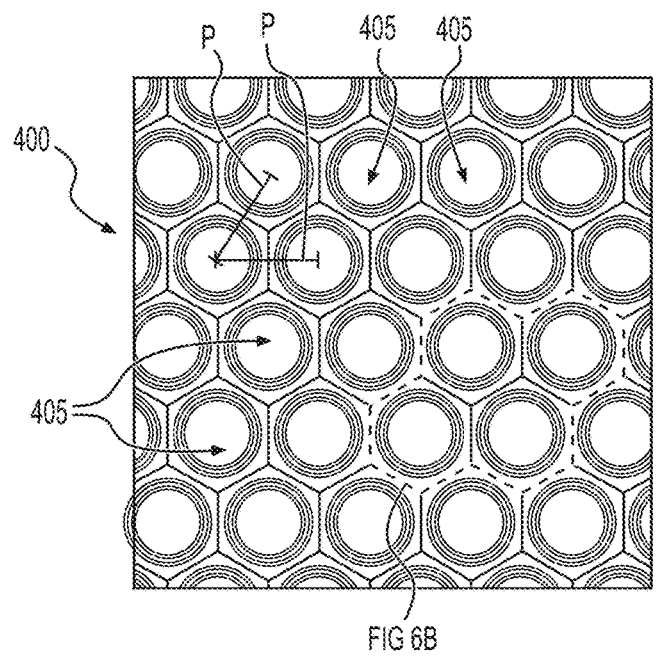
FIG. 6A is a schematic, magnified, cross-sectional view of a simple hexagonal pitch active core

FIG. 6A is a schematic, magnified, cross-sectional view of a simple hexagonal pitch active core. The fuel assembly 400 includes a plurality of fuel unit cells 405 and control unit cells (not shown) in periodic arrangement (in cross-sectional view). The cross-sectional view in FIG. 6A extends to the inner surface of the reflector, such as a graphite reflector, with a core former providing mating for any geometric mismatch. As seen in cross-sectional view in the magnified fuel unit cells in FIG. 6B (corresponding to the four fuel unit cells 405 enclosed by dashed lines in FIG. 6A), each fuel unit cell 405 includes a fissionable fuel composition 410 located within a cladding structure 415 having an inner cladding 420 with an inner surface oriented toward the fissionable fuel composition 410 and an outer cladding 425 with an outer surface oriented toward a graphite moderator 430 of the fuel unit cell 405. The fissionable fuel composition 410 and inner cladding 420 constitute a fuel (or control) rod cross-section.

The inner cladding 420 and the fissionable fuel composition 410 are dimensionally offset to form a gap. This gap makes it easier to insert the fuel composition into the cladding during mechanical loading and also provides a fission gas relief void. The space between the inner cladding 420 and outer cladding 425 defines a flow annulus 435 for coolant, such as gas, to flow. The outer cladding 425 and the graphite moderator 430 are intimately affixed, for example by hot isostatic pressing or press fitting. The outer cladding 425 that separates the flow annulus 435 from the graphite moderator 430 acts as an erosion barrier, without which the hot, high-pressure, and fast moving coolant would erode the graphite moderator 430 resulting in decreased life cycle. The flow annulus 435 inner and outer surface are held stable by flow annulus features (addressed further herein).

Figure 7:
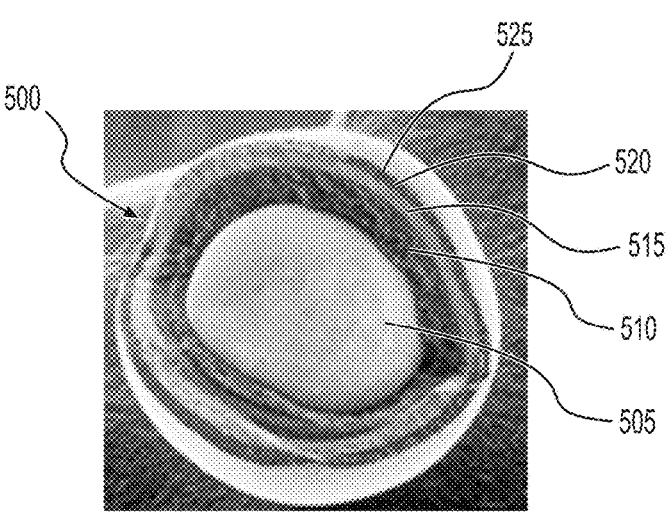
FIG. 7 is an electron microscope image of a TRISO fuel particle.

The fissionable fuel composition 410 can be any suitable fissionable fuel composition, including TRISO fuel compositions as well as non-TRISO fuels, such as compositions including UCO TRISO, UO2 TRISO, U-metal, UO2, UN, and other nuclear fuel (hafnium, thorium, plutonium, etc.). FIG. 7 is an electron microscope image of an exemplary TRISO fuel particle 500. The TRISO fuel particle 500 includes a fuel kernel 505 surrounded by a buffer layer 510, an inner pyrocarbon layer 515, a silicon carbide (SiC) layer 520, and an outer pyrocarbon layer 525. Each of the layers performs an accident-tolerant task, including (in order from inner layer to outer layer) stress mitigation, flexibility, strength and containment. The kernel can be a suitable fissionable fuel, examples of which include a 1 mm diameter particle of UO2 or UCO fuel. The TRISO particle is placed into a matrix of carbon and resin and formed into pellet-shaped fuel or compacts-shaped fuel.

Figure 6B:
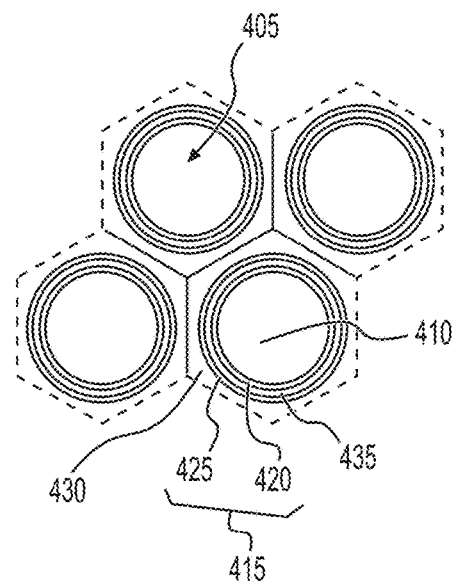
FIG. 6B is a magnified view of a portion of FIG. 6A.

The arrangement in FIGS. 6A-B represents a simple hexagonal pitch reactor design, where the pitch is the distance between the centerline of the regions containing the fissionable fuel composition in adjacent fuel unit cells. For example, in the FIGS. 6A-B embodiment with a fissionable fuel composition 410 having a 12.45 mm diameter, the pitch (P) can be 3 to 8 cm.

The arrangement shown in FIGS. 6A-B is a singular example and the base dimensions can be altered to optimize different reactor properties based on material ratios (e.g. fuel enrichment or U-235 mass minimization).

Figure 8:
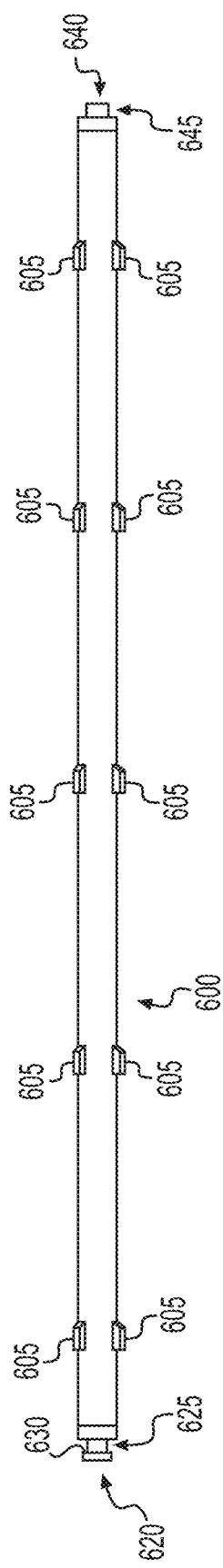
FIG. 8 schematically illustrates external features associated with exemplary fuel rods.
Figure 9:
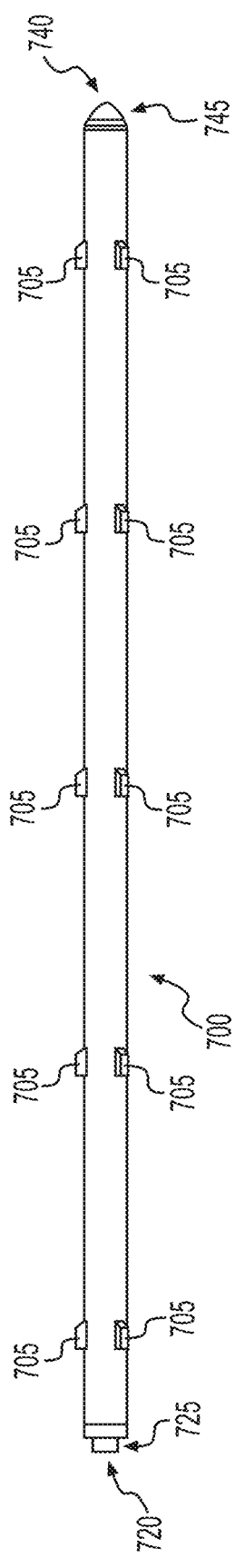
FIG. 9 schematically illustrates external features associated with exemplary control rods.
Figure 10:
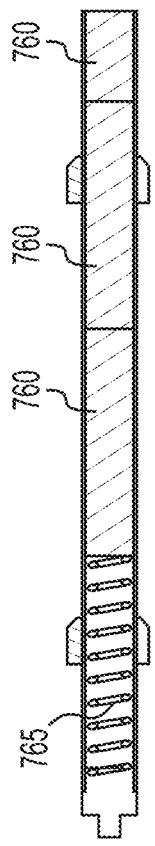
FIG. 10 schematically shows a cross-section of a portion of a control or fuel rod.

The flow annulus 435 is stabilized with structural features that are either on the outer surface of the inner cladding 420 or on the inner surface of the outer cladding 425. FIGS. 8 and 9 schematically illustrate examples of external features associated with exemplary embodiments of fuel rods (FIG. 8) and control rods (FIG. 9). FIG. 10 schematically shows a cross-section of a portion of the control rod in FIG. 9. Both fuel rods 600 and control rods 700 use the same basic design with pelletized neutronic material (fuel or absorber) clad over a length of the rod, such as an approximate two meter span as in some embodiments. The cladding can be any suitable material, including all types of Zircaloy, stainless steel, or molybdenum.

Figure 11:
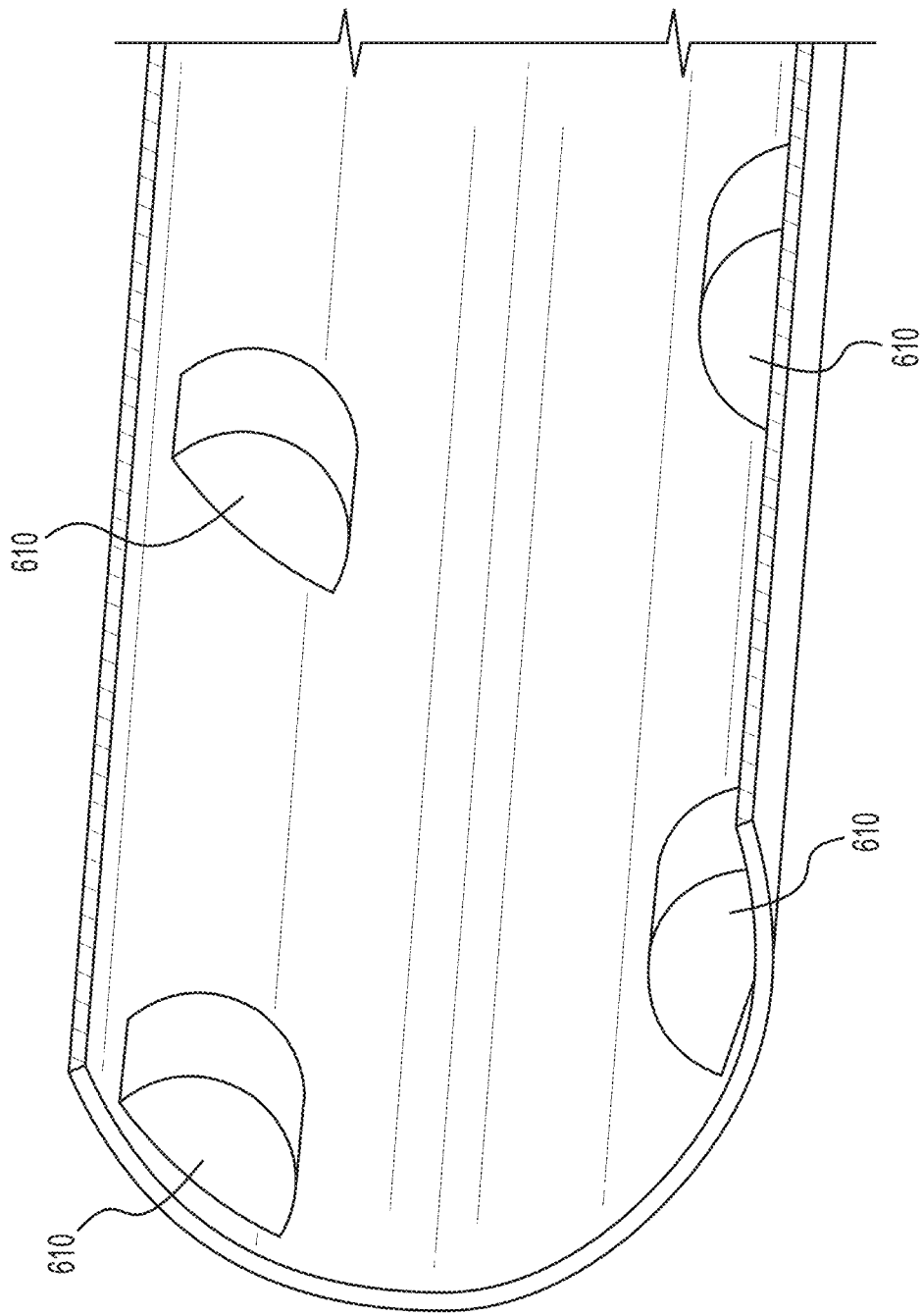
FIG. 11 is a schematic, cut-away, perspective view of a portion of the interior of a unit cell cladding showing flow annulus features on the inner diameter surface of the cladding.

At equally spaced axial intervals along the length of the fuel rod 600 and/or control rod 700, there are flow annulus features distributed at equal intervals/spacing about the circumference of the cladding, whether as tags 605, 705 on the outer surface of the inner cladding 420 (see FIGS. 8-10) and/or as dimples 610 on the inner surface of the outer cladding 425 (see FIG. 11), whether on the inner surface of the outer cladding of the fuel rods 600 or of the control rods 700. In exemplary embodiments, there are at least three flow annulus features at specified longitudinal locations along the length and they are circumferentially distributed at 30±5 to 60±5 degree intervals, although other angular separations can be used where the angular separation satisfies the relationship 360/N, where N≥3. In some embodiments, there are flow annulus features located at equally-spaced, longitudinal locations along the length of the outer surface of the inner cladding/inner surface of the outer cladding and, at each longitudinally separated location, the flow annulus features are circumferentially distributed at a specified interval, such as at 30±5 to 90±5 degree intervals. The locations of flow annulus features at least at two of the successive longitudinal locations (alternatively at each successive longitudinal location) are rotated by half the degree interval (i.e., 180/N) to prevent the flow annulus features from riding in any longitudinally extending guide grooves. For example, if first flow annulus features at longitudinal position A are at 120, 240 and 360 degrees around the circumference (in relation to an arbitrary reference point), then second flow annulus features at longitudinal position B are at 60, 180 and 300 degrees around the circumference (in relation to an arbitrary reference point). In addition, longitudinal locations are spaced such that at least three longitudinal locations are present in the control guide 1020 at any particular time.

The flow annulus features are attached to the cladding by suitable means, such as TIG welding, brazing, or resistance welding. The flow annulus features—whether tags 605, 705 or dimples 610—act as a guide during assembly and control insertion, and stabilize the flow annulus 435. Stabilizing the flow annulus is beneficial because, for example, the flow annulus features maintain a reliable concentricity between the inner and outer claddings that envelope the flow annulus. Without a stable flow annulus, there could be consequential hot spots that downgrade the longevity of the reactor. In a secondary effect, the flow annulus features can act as a flow turbulator, increasing convection.

Both the fuel rods 600 and control rods 700 include an upper end cap and a lower end cap, which seal the rod and completes the rod pressure barrier. Although both the fuel rods 600 and control rods 700 have such caps, the caps differ between the fuel rods 600 and the control rods 700. For example, the upper end cap 620 on the fuel rod 600 has a groove 625 with a circular ledge 630 to engage an external hold-down spring and a grappling device for reconstitution. The upper end cap 720 on the control rod 700 has a threaded feature 725, such as a threaded post, to engage a drive system of the control rods drive mechanism. Also for example, the lower end cap 640 on the fuel rod 600 has a threaded feature 645, such as a threaded post, to statically engage a bottom fuel assembly or core plate. The lower end cap 740 of the control rod 700 has a tapered head 745 for guiding the control rod 700 as the control rods 700 are moved (T) into and out of the active core region to control reactivity during operation.

The fuel rods 600 include fissionable fuel material and control rods 700 can include both fissionable fuel material and absorber material, depending on the design of the reactor. When present, fissionable fuel material in control rods indicate a subcritical static core that becomes critical as control rods are inserted; when present, absorber material in control rods indicate a supercritical static core that is suppressed to a critical/subcritical state when the control rods are inserted. FIG. 10 shows a generalized cross-section of a portion of a control rod. The internal features include fissionable fuel material or absorber material 760 and an internal hold-down spring 765 located in a plenum to minimize pellet vibration and establish a void for fission gas release. The composition of the fissionable fuel material or absorber material 760 can be altered (compositionally and spatially) to mitigate temperature and fission peaking. A generalized cross-section of a portion of a fuel rod would look similar to the control rod cross-section shown in FIG. 10, except that the threaded feature 725 would be replaced with upper end cap 620.

Figure 12A:
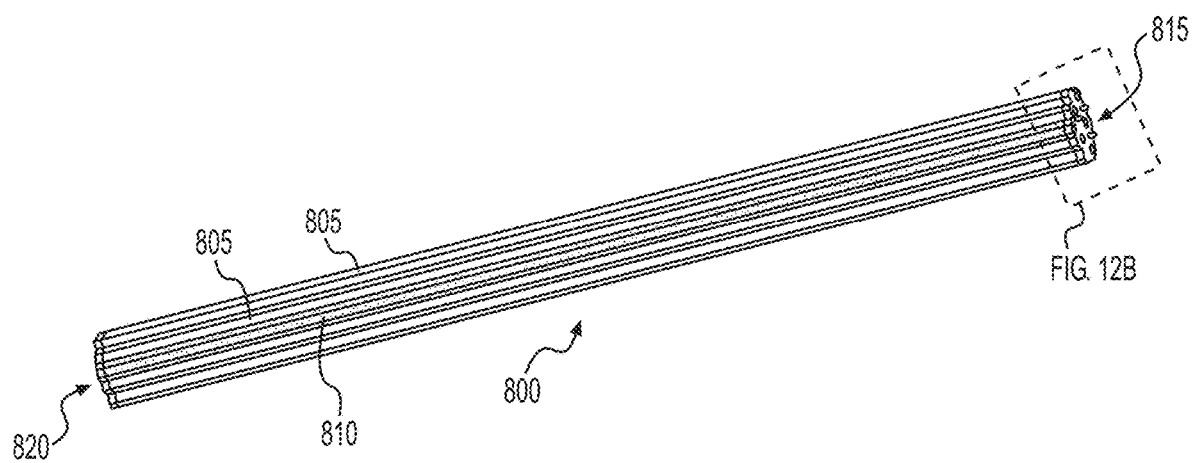
FIGS. 12A and 12B is a schematic, side view of a fuel assembly (FIG. 12A) and a magnified perspective view of an end portion of the fuel assembly with associated features.
Figure 12B:
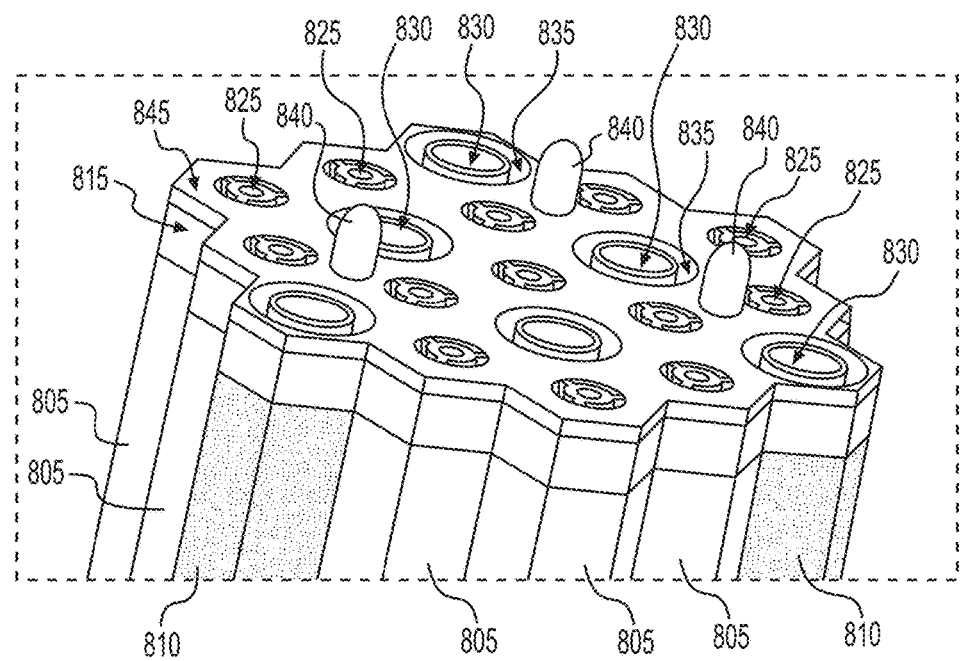

FIGS. 12A and 12B are a schematic side view of a fuel assembly (FIG. 12A) and a magnified, perspective view of an end portion of the fuel assembly with associated features (FIG. 12B). The fuel assembly 800 is an assemblage of both fuel unit cells 805 and control unit cells 810 between a top plate 815 and a bottom plate 820. Individual fuel rods 600 and control rods 700 are located in the fuel assembly 800 amongst their associated unit cells, and the fuel assembly 800 is located within the active core region of the reactor, so as to achieve desired neutronics. FIG. 12B is a magnified perspective view of the top end of the fuel assembly 800 and showing the top plate 815. As shown, thirteen fuel unit cells 805 and six control unit cells 810 are included in the fuel assembly 800 (although other numbers of fuel unit cells and control unit cells can be used) and the top plate 815 contributes to holding these unit cells in position. Some rods inserted into the unit cells in the fuel assembly 800 are dynamic (e.g., the control rods 700) and will govern reactivity while other rods inserted into the unit cells in the fuel assembly 800 are static (e.g., the fuels rods 600). The top plate 815 includes openings 825, which correspond with and lead to the flow annulus 435 of the fuel unit cell 805, and control rod insertion holes 830, which correspond with and lead to the control rod channel of the control rod unit cell 700. A counterbore 835 is provided around the control rod insertion holes 830 to allow for a threaded fastener, such as a tightening nut, to have access to threads of a threaded feature on an outer surface of the control rod insertion hole 830. A plurality of asymmetric pins 840 protrude from the surface 845 of the top plate 815 and are aligned with holes in the upper core plate 315. A plurality of asymmetric pins also protrude from the surface of the bottom plate 820 and provide similar alignment function with the lower core plate 320.

Figure 13A:
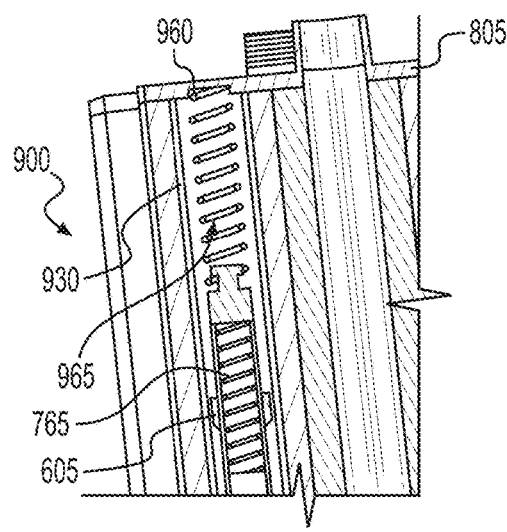
FIGS. 13A-D are schematic illustrations of various features of the fuel assembly, including features associated with the fuel unit cell and control unit cell.
Figure 13C:
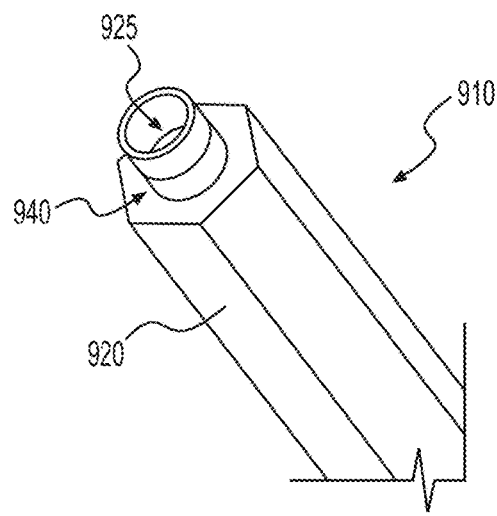
Figure 13B:
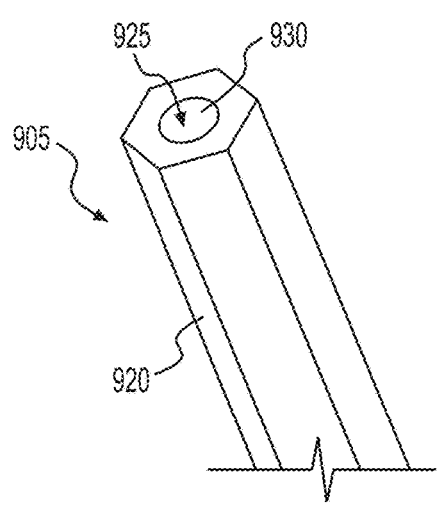
Figure 13D:
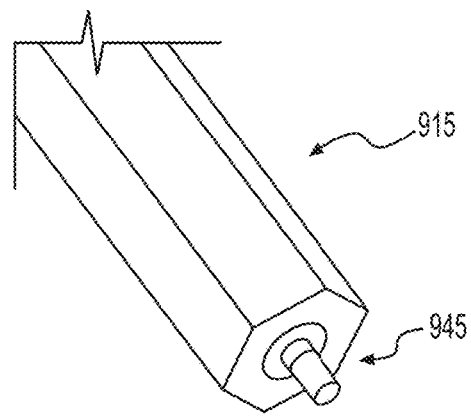

FIGS. 13A-D are schematic illustrations of the fuel assembly, including features associated with the fuel unit cell and control unit cell. FIG. 13A shows a partial, cross-sectional view of the fuel assembly 900, FIG. 13B shows an example of a static fuel unit cell 905; FIG. 13C shows an example of a top section of a control unit cell 910; and FIG. 13D shows an example of a bottom section of a control unit cell 915. As readily seen, the bodies of the unit cells are hexagonal, long sleeves of graphite 920 that have a channel 925 in which the cladding 930 is located (note the cladding is the observable inner diameter surface in FIG. 13B, but is not visible in FIG. 13C). In some embodiments, the cladding is inserted via a press fit method. The cladding 930 acts as a barrier between the graphite 920 and coolant (when flowing through the cladding). The cladding 930 also guides any static fuel rods inserted into the channel 925 of the static fuel unit cell 905 during assembly. The channel 925 in FIG. 13C corresponds to the control rod insertion hole 830 and guides any control rods present in the channel 925 of the control unit cell 910 during operation.

The control unit cells 910 has an upper guide cap 940 and lower guide cap 945. The lower guide cap 945 is a post or other protrusion that fits into a recess in the bottom plate 810. The upper guide cap 940 includes a threaded feature on the outer surface (described above in connection with control rod insertion hole 830) that receives a threaded fastener, such as a nut, to clamp the control unit cell (and the adjacent fuel unit cells) in place between the bottom plate 820 and the top plate 815 in the fuel assembly 800 (see also FIGS. 12A and 12B).

As seen in FIG. 13A, the fuel unit cell cladding 930 longitudinally extends to and/or overextends the end of the graphite 920 and joins the top and bottom plates 805, 820 to encapsulate a recess 960. The recess 960 provides a housing and bearing surface for the external hold-down spring 965 that engages with the circular ledge 630 of the groove 625 of the upper end cap 620 on the fuel rod 600. The external hold-down spring 965 bears against the upper end cap 620 on the fuel rod 600 to provide a seating bias to the fuel rod 600 (see FIG. 8). Internal hold-down spring 765 is also visible in FIG. 13A.

Note that the static fuel unit cell 905 does not have an upper end cap (and though not shown, also does not have a lower end cap). Rather, the static fuel unit cell 905 is held in place directly by the top and bottom plates 815, 820.

Figure 14:
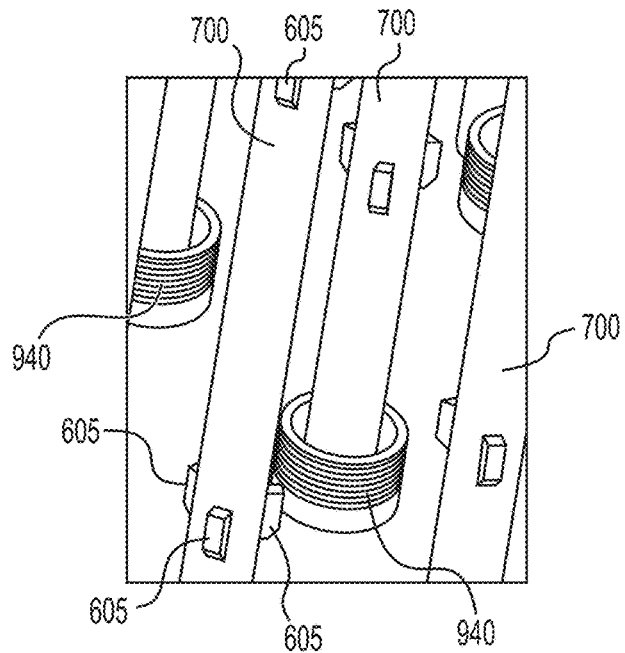
FIG. 14 is a magnified, perspective schematic view of control rods inserted into the reactor.

FIG. 14 is a magnified, perspective schematic view of control rods 700 inserted into the upper guide cap 940. The threads of the upper guide cap 940 are exposed. Once the control unit cell 810 are assembled into an assembly 800 with the top and bottom plates 815, 820, the threads of the upper guide cap 940 would typically receive a fastener, such as a nut that would be tightened to clamp the upper guide cap 940 (and hence the control unit cell 810) to the top plate 815.

The control unit cells 810 (and their position in the active core) provide control of the reactivity of the reactor. This reactivity can be controlled positively or negatively. In positive control, the reactivity is increased as a rod loaded with fissionable fuel is inserted into the core. In negative control, the reactivity is decreased as a rod loaded with absorber (or neutron poison) is inserted into the core. For longevity of duty cycle, one option is to slowly insert fuel loaded control rods to slowly burn the fuel. The fine-tuned movement of the fuel loaded control rods can be controlled by a control rod motor that engages the shaft 330 in the CRDM.

Figure 15:
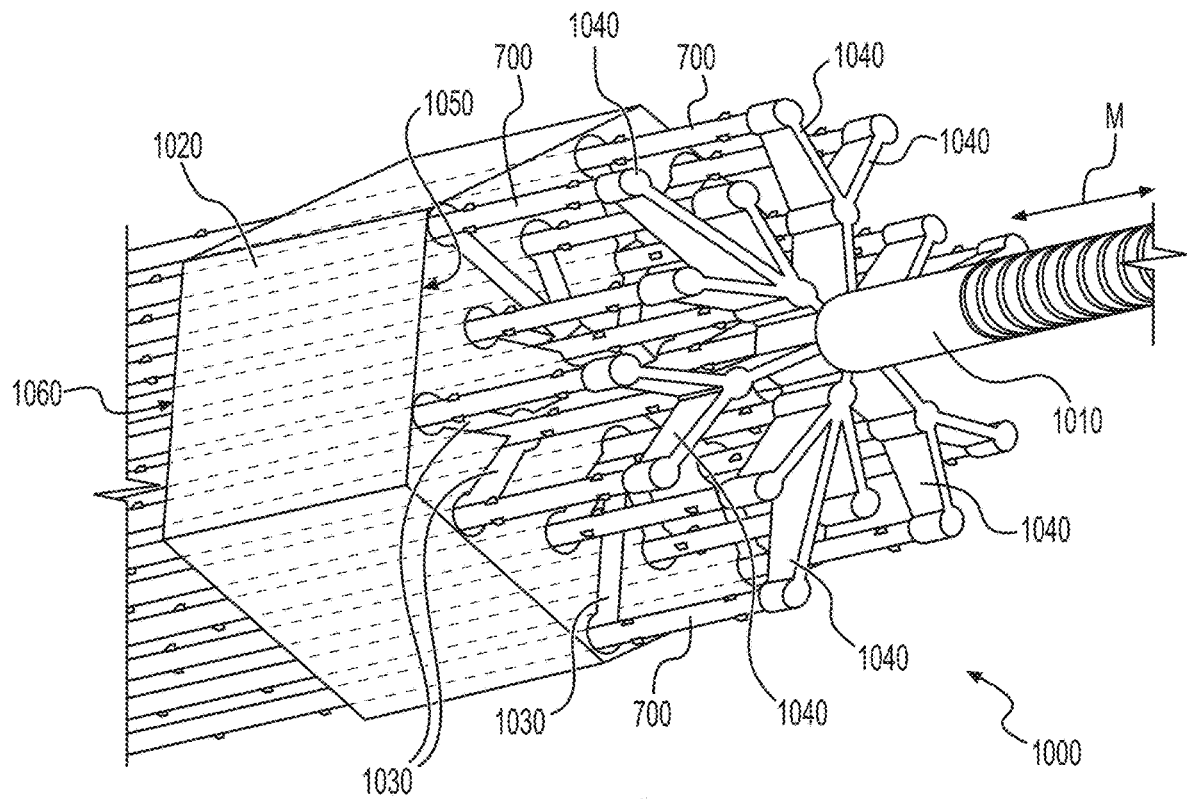
FIG. 15 is a perspective schematic view showing a guiding mechanism for the control rods.

The reactivity can be controlled by movement of the control rods 700, either singularly or as a group (also called a control rod bundle). FIG. 15 is a perspective schematic view showing a guide mechanism 1000 for the control rods 700. In the view, control rods 700 are attached to a translatable control rod assembly 1010 (also known as a "spider") which can collectively translate the plurality of attached controlled rods. The control rods are supported along their length by a guide structure 1020. In a horizontal orientation of the graphite reactor, such a guide structure 1020 can mitigate sagging of the control rods when extended outside of the active core. The guide structure 1020 itself is positioned at an axial location above the active core and affixed by mating it directly or indirectly to the inner surface of the pressure vessel.

The control rod assembly 1010 is translatable (M) so that control rods 700 can be fully inserted into the active core. To accommodate full insertion, the guide structure 1020 has openings or slots 1030 to accommodate the arms 1040 of the control rod assembly 1010 and to allow for such full insertion. Here, the previously described tags 705 on the control rods 700 contribute to guide the control rods 700 relative to the guide structure 1020 during insertion. For example, circumferentially separated tags 705 rotationally offset at successive axial locations along the length of the outer surface of the control rod provide that no tag 705 can ride or otherwise be stuck in an opening or slot 1030 and that the tags 705 will provide proper spacing between the outer circumference of the control rod 700 and the inner surface formed by the length of the opening or slot 1030 (as the opening or slot 1030 runs from the top surface 1050 of the guide structure 1020 to the bottom surface 1060 of the guide structure 1020). This arrangement of the tag features 705 will prevent the fuel/control rod claddings from scraping against the guide structure 1020, which could otherwise potentially damage the fuel/control rod.

Figure 16A:
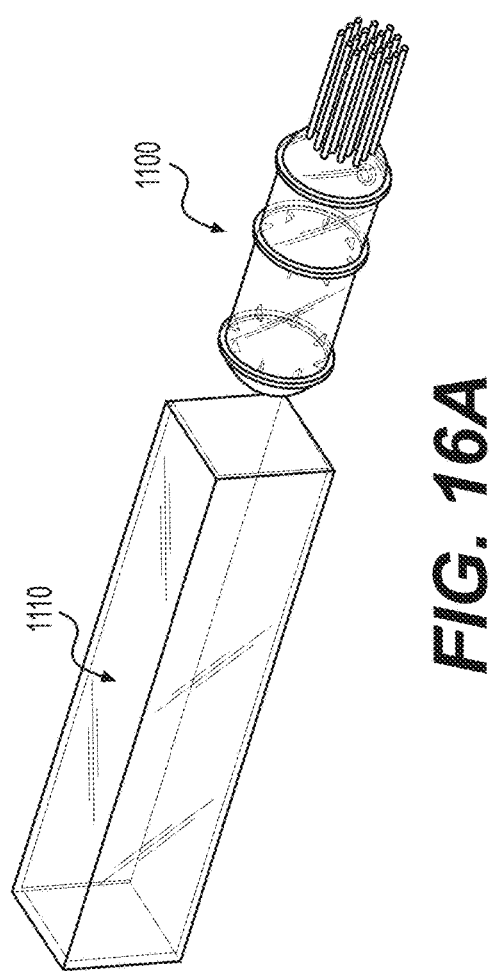
FIGS. 16A and 16B show perspective and side views of an exemplary mobile graphite reactor and associated container for mobile transportation.
Figure 16B:
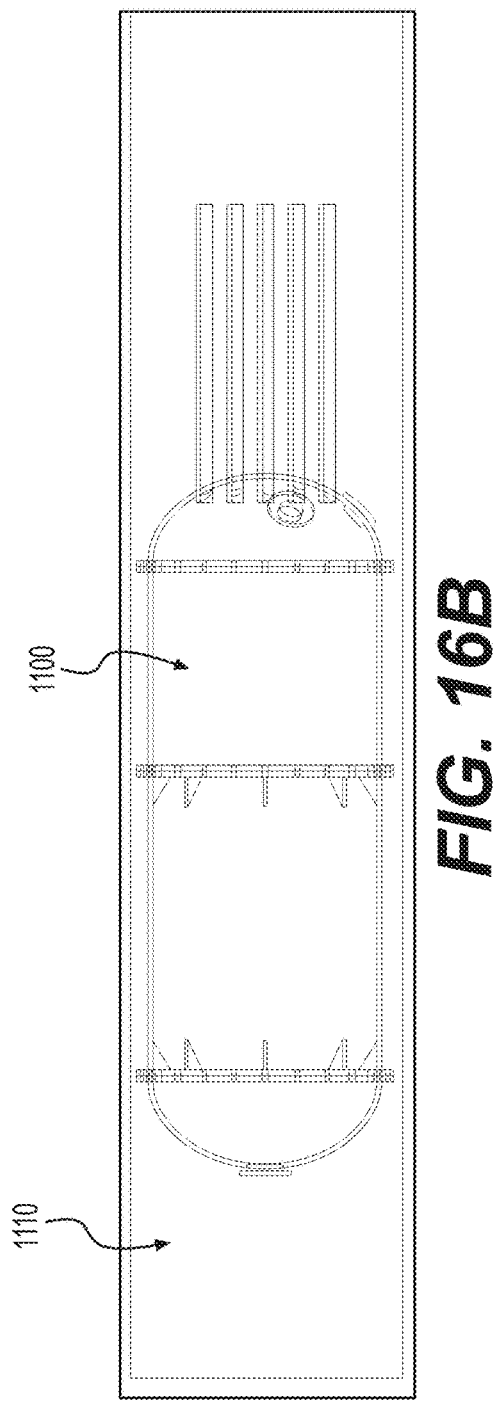

FIGS. 16A and 16B show a perspective view and side, transparent view, respectively, of an exemplary mobile graphite-moderated fission reactor 1100 and associated container 1110 for mobile transportation. In exemplary embodiments, the container 1110 can be a standard ISO shipping container, which is 8 ft (2.43 m) wide, 8.5 ft (2.59 m) high and come in two lengths—20 ft (6.06 m) and 40 ft (12.2 m). Extra tall shipping containers (called high-cube containers) can also be used and are 9.5 ft (2.89 m) high. Other suitable containers can be used that allow for loading onto and transport by equipment such as ships, trains and trucks. In the illustrated example, the container 1110 is a 40 foot long standard ISO shipping container.

Although the present invention has been described in connection with embodiments thereof, it will be appreciated by those skilled in the art that additions, deletions, modifications, and substitutions not specifically described may be made without departure from the spirit and scope of the invention as defined in the appended claims. For example, although described in relation to fissionable fuel materials, nuclear reactors, and associated components, the principles, compositions, structures, features, arrangements and processes described herein can also apply to other materials, other compositions, other structures, other features, other arrangements and other processes as well as to their manufacture and to other reactor types.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

What is claimed is:

1. A mobile, graphite-moderated fission reactor, comprising:
    a pressure vessel defining an interior volume,
    an active core region located within the interior volume of the pressure vessel, the active core region including a fuel assembly and a reflector; and
    at least one control system including a plurality of control rod drive mechanisms, wherein at least a portion of the at least one control system is located in a control region within the interior volume of the pressure vessel, wherein the fuel assembly includes a plurality of fuel unit cells and a plurality of control unit cells, each unit cell including a longitudinally extending graphite body with a longitudinally extending channel with a cladding, wherein a fuel rod is positioned in the channel of each of the plurality of fuel unit cells and forms a fuel rod flow annulus between an outer surface of the fuel rod and an inner surface of the cladding of the channel of the fuel unit cell, wherein a plurality of fuel rod flow annulus features are attached to the inner surface of the cladding of the channel of the fuel unit cell, wherein the plurality of fuel rod flow annulus features are positioned at longitudinally separated locations in an axial direction of the fuel rod flow annulus, wherein, at each longitudinally separated location, the plurality of fuel rod flow annulus features are circumferentially distributed at radially equal intervals such that an angular separation of the plurality of fuel rod flow annulus features at each longitudinally separated location satisfies the relationship 360/N, where N is the number of fuel rod flow annulus features at the longitudinally separated location and N≥3, wherein the fuel rod flow annulus features at a first longitudinally separated location are rotationally offset relative to the fuel rod flow annulus features at an adjacent longitudinally separated location, and wherein the pressure vessel is sized for mobile transport using a ship, train or truck.

2. The mobile, graphite-moderated fission reactor according to claim 1, wherein an amount of the rotational offset of the fuel rod flow annulus features is half the angular separation of the fuel rod flow annulus features.

3. The mobile, graphite-moderated fission reactor according to claim 1, wherein the longitudinally separated locations are equally spaced in the axial direction of the annulus.

4. The mobile, graphite-moderated fission reactor according to claim 1, further including a shipping container, wherein the pressure vessel is contained within the shipping container.

5. The mobile, graphite-moderated fission reactor according to claim 1, wherein the plurality of fuel rod flow annulus features attached to the inner surface of the cladding of the channel of the fuel unit cell are a first plurality of fuel rod flow annulus features, and wherein a second plurality of fuel rod flow annulus features are attached to the outer surface of the fuel rod.

6. The mobile, graphite-moderated fission reactor according to claim 1, wherein a control rod is positioned in the channel of each of the plurality of control unit cells and forms a control rod flow annulus between an outer surface of the control rod and an inner surface of the cladding of the channel of the control unit cell, and wherein a plurality of control rod flow annulus features are attached to the inner surface of the cladding of the channel of the control unit cell.

7. The mobile, graphite-moderated fission reactor according to claim 6, wherein the plurality of control rod flow annulus features are circumferentially distributed at radially equal intervals.

8. The mobile, graphite-moderated fission reactor according to claim 6, wherein the plurality of control rod flow annulus features are equally spaced at longitudinally separated locations.

9. The mobile, graphite-moderated fission reactor according to claim 6, wherein the plurality of control rod flow annulus features are equally spaced at longitudinally separated locations, and wherein, at each longitudinally separated location, the plurality of control rod flow annulus features are circumferentially distributed at radially equal intervals.

10. The mobile, graphite-moderated fission reactor according to claim 9, wherein the control rod flow annulus features at successive, longitudinally separated locations are rotationally offset relative to each other.

11. The mobile, graphite-moderated fission reactor according to claim 9, wherein, at each longitudinally separated location, there are three or more control rod flow annulus features.

12. The mobile, graphite-moderated fission reactor according to claim 11, wherein the control rod flow annulus features at successive, longitudinally separated locations are rotationally offset relative to each other.

13. The mobile, graphite-moderated fission reactor according to claim 6, further including a shipping container, wherein the pressure vessel is contained within the shipping container.

14. The mobile, graphite-moderated fission reactor according to claim 6, wherein the plurality of control rod flow annulus features are positioned at longitudinally separated locations in an axial direction of the control rod flow annulus, wherein, at each longitudinally separated location, the plurality of control rod flow annulus features are circumferentially distributed at radially equal intervals such that an angular separation of the plurality of control rod flow annulus features at each longitudinally separated location satisfies the relationship 360/N, where N is the number of control rod flow annulus features at the longitudinally separated location and N≥3, and wherein the control rod flow annulus features at a first longitudinally separated location are rotationally offset relative to the control rod flow annulus features at an adjacent longitudinally separated location.

15. The mobile, graphite-moderated fission reactor according to claim 14, further including a shipping container, wherein the pressure vessel is contained within the shipping container.

16. The mobile, graphite-moderated fission reactor according to claim 14, wherein an amount of the rotational offset of the control rod flow annulus features is half the angular separation of the control rod flow annulus features.

17. The mobile, graphite-moderated fission reactor according to claim 6, wherein the plurality of control rod flow annulus features attached to the inner surface of the cladding of the channel of the control unit cell are a first plurality of control rod flow annulus features, and wherein a second plurality of control rod flow annulus features are attached to the outer surface of the control rod.

18. The mobile, graphite-moderated fission reactor according to claim 17, wherein the control rods are translatable relative to a guide structure, and wherein at least three longitudinally separated locations of the second plurality of control rod flow annulus features are present in the guide structure during translation of the control rods.

* * * * *